US011117305B2

(12) United States Patent
Backmann

(10) Patent No.: US 11,117,305 B2
(45) Date of Patent: Sep. 14, 2021

(54) METHOD FOR CHANGING THE MATERIAL IN AN EXTRUSION DEVICE

(71) Applicant: Windmöller & Hölscher KG, Lengerich (DE)

(72) Inventor: Martin Backmann, Lengerich (DE)

(73) Assignee: Windmöller & Hölscher KG, Lengerich (DE)

(*) Notice: Subject to any disclaimer, the term of this patent is extended or adjusted under 35 U.S.C. 154(b) by 425 days.

(21) Appl. No.: 15/832,603

(22) Filed: Dec. 5, 2017

(65) Prior Publication Data
US 2018/0093405 A1 Apr. 5, 2018

Related U.S. Application Data

(63) Continuation of application No. PCT/EP2016/060449, filed on May 10, 2016.

(30) Foreign Application Priority Data

Jun. 8, 2015 (DE) .................... 10 2015 108 979.3

(51) Int. Cl.
*B29C 48/10* (2019.01)
*B29C 31/06* (2006.01)
(Continued)

(52) U.S. Cl.
CPC .......... *B29C 48/2692* (2019.02); *B29B 7/603* (2013.01); *B29C 31/02* (2013.01); *B29C 31/06* (2013.01); *B29C 31/10* (2013.01); *B29C 48/0018* (2019.02); *B29C 48/08* (2019.02); *B29C 48/10* (2019.02); *B29C 48/271* (2019.02);
(Continued)

(58) Field of Classification Search
CPC .................... B29C 48/92; B29C 31/10; B29C 2948/92333; B29C 48/49
See application file for complete search history.

(56) References Cited

U.S. PATENT DOCUMENTS

| 4,955,550 A * | 9/1990 | Satake ...................... B29B 7/78 241/101.4 |
| 2015/0367553 A1* | 12/2015 | Backmann ............ B29C 48/271 425/145 |
| 2016/0009014 A1* | 1/2016 | Schmitz .................. B29C 48/49 264/40.1 |

FOREIGN PATENT DOCUMENTS

| DE | 102013100812 | 7/2014 |
| DE | 102013100866 | 3/2016 |

(Continued)

OTHER PUBLICATIONS

A Troubleshooting Guide for film extrusion (Year: 1994).*
(Continued)

*Primary Examiner* — Nahida Sultana
*Assistant Examiner* — Debjani Roy
(74) *Attorney, Agent, or Firm* — Levine Bagade Han LLP

(57) ABSTRACT

The present invention relates to a method for changing material in an extrusion device comprising at least two supply devices for supplying feedstock for an extruder, comprising the following steps:
identifying a change request for changing material in an extrusion device,
predetermining a production stability for a time after the material of at least one supply device has been changed,
comparing the predetermined production stability to a threshold value of stability,
changing the material in at least one supply device depending on the result of comparison.

15 Claims, 10 Drawing Sheets

(51) Int. Cl.
*B29C 48/25* (2019.01)
*B29C 48/08* (2019.01)
*B29C 48/00* (2019.01)
*B29C 48/92* (2019.01)
*B29C 48/27* (2019.01)
*B29C 48/285* (2019.01)
*B29B 7/60* (2006.01)
*B29C 31/02* (2006.01)
*B29C 31/10* (2006.01)

(52) U.S. Cl.
CPC .......... *B29C 48/286* (2019.02); *B29C 48/297* (2019.02); *B29C 48/92* (2019.02); *B29C 2948/9298* (2019.02); *B29C 2948/92333* (2019.02); *B29C 2948/92828* (2019.02)

(56) References Cited

FOREIGN PATENT DOCUMENTS

| EP | 0290999 | 11/1988 | | |
|----|---------|---------|---|---|
| GB | 2177819 B | * | 7/1989 | ......... B29C 48/2888 |
| JP | 1996090637 | 4/1996 | | |
| WO | WO 2013/182869 | 12/2013 | | |

OTHER PUBLICATIONS

Herrmann, H et al. "Auf dem Weg zur flexiblen und intelligenten Aufbereitungsanlage," *Kunststoffe*, vol. 78, No. 10, pp. 876-884, Oct. 1, 1988.

K-TRON: Smart Refill Technology in Loss-in-Weight Feeding, Internet Citation, pp. 1-5, Nov. 8, 2011, http://www.ptonline.com/cdn/cms/uploadedFiles/KtronSmart_Refill.pdf.

PCT International Patent Application No. PCT/EP2016/060449 filed Dec. 10, 2016 in the name of Windmöller & Hölscher KG, International Search Report and Written Opinion dated Jul. 28, 2016.

PCT International Patent Application No. PCT/EP2016/060449 filed Dec. 10, 2016 in the name of Windmöller & Hölscher KG, Written Opinion of the International Preliminary Examining Authority dated May 19, 2017.

PCT International Patent Application No. PCT/EP2016/060449 filed Dec. 10, 2016 in the name of Windmöller & Hölscher KG, International Preliminary Report on Patentability dated Aug. 10, 2017.

* cited by examiner

__METHOD FOR CHANGING THE MATERIAL IN AN EXTRUSION DEVICE__

CROSS-REFERENCE TO RELATED APPLICATIONS

This application is a continuation of PCT International Patent Application No. PCT/EP2016/060449 filed May 10, 2016, which claims benefit of priority to German Patent Application No. 10 2015 108 979.3 filed Jun. 8, 2015, the contents of which are incorporated herein by reference in its entirety.

DESCRIPTION

The present invention relates to a method for changing the material in an extrusion device.

In extrusion devices for producing plastic films, it is known that the material needs to be changed in order to be able to change between different products in the production. Changing the material thereby refers to a transition from an application formula to a subsequent formula. Each formula has a large variety of combinations of feedstock or subsequent materials, respectively, which need to be exchanged accordingly during the transition in the form of changing the material. In an extrusion device, provision is typically made for an extruder comprising a plurality of supply devices, from which the feedstock needs to be removed and needs to be replaced by subsequent material.

It is a disadvantage of the known solutions that the material change is typically carried out manually in order. As a result, the change strategy or the change order, respectively, of the individual feedstock or subsequent materials, respectively, can be chosen freely by manually changing the material on the basis of the experience of a machine operator. This can have the result that the production stability varies while changing the material. In particular in the case of inexperienced machine operators, this is only possible, when a second person monitors the production stability and reacts to a changed production stability by changing the production parameters. This, however, leads to high staffing efforts and simultaneously to an increased expenditure of time, because a corresponding reaction time needs to be planned for such a reaction in the form of changed production parameters when changing the material.

It is the object of the present invention to at least partially eliminate the above-described disadvantages. It is in particular the object of the present invention to improve changing the material in a cost-efficient and simple manner or to make it safer, respectively.

The above object is solved by means of a method comprising the features of claim 1. Further features and details of the invention follow from the dependent claims, the description and the drawings. It goes without saying that features and details, which are described in connection with the method according to the invention according to the main claim, shall thereby also apply in connection with the method according to the invention according to the dependent claims and in each case vice versa, so that, with regard to the disclosure, reference is or can mutually always be made, respectively, to the individual invention aspects.

A method according to the invention serves the purpose of changing material in an extrusion device comprising at least two supply devices. These supply devices serve the purpose of supplying feedstock for an extruder. Such a method comprises the following steps:

identifying a change request for changing material in an extrusion device, predetermining a production stability for a time after the material of at least one supply device has been changed, comparing the predetermined production stability to a threshold value of stability, changing the material in at least one supply device depending on the result of comparison.

In the case of a method according to the invention, a prediction is thus made in the form of a predetermination of a production stability. A production stability is thereby to be understood to be any form of a factor or of a combination of different factors, which impact the stable continuation of the production. Such a production stability can for example be associated with or depend on a bubble stability during the production of a plastic bubble of a blown film production. Other production stability factors, such as, for example, the temperature profile in an extruder, the correlation between temperatures inside the system and corresponding melting temperatures of individual materials or the like, can be identified as production stability in the context of the present invention. On principle, every parameter, which has a correlation between the feedstock or the subsequent material, respectively, on the one hand, and an operating parameter of the extrusion device on the other hand, is to be understood as a production stability parameter.

According to the invention, this production stability is now predetermined for a point in time after the material of at least one supply device has been changed. In the known extrusion devices, typically two or more supply devices are provided for each extruder. For the production of a multi-layered plastic film, typically one extrusion device is provided for each plastic layer of the film, so that a plurality of extrusion devices comprising a corresponding plurality of supply devices provides a high complexity of different feedstock combinations or subsequent material combinations, respectively. It is important to note thereby that a stable composition based on the production stability is to be assumed at least while running the application formula and while to running a completely converted subsequent formula. However, the transition between the application formula and the subsequent formula, which can also be identified as intermediate production status, can be carried out in a variety of ways. On principle, the right to decide freely, which feedstock is changed first or last, respectively, in which supply device, exists. This order, however, is decisive for the course of the production stability between the application formula and the subsequent formula.

According to the invention, a predetermination of a production stability for the time after the material has been changed is now carried out for each individual changing step, thus in particular in at least one supply device. In other words, a verification is made, how the subsequent change of the material of at least one supply device can impact the respective production stability factor. For example, a deterioration of the production stability in the form of a decrease of the corresponding parameter can thus be predetermined by changing from a feedstock to a subsequent material in a specific supply device. According to the invention, it is to now subsequently be determined, whether or not this limitation and reduction of the production stability is within an acceptable range. This is carried out in the comparing step, by which the predetermined production stability is compared to a threshold value of stability.

The above-described threshold value of stability can thereby be provided in a variety of ways. The threshold value of stability is in particular a free lower limit, which is to be understood as lower limit for the respective production stability parameter or the combination of these parameters. This threshold value of stability can thereby be independent of which production stability can be attained in the application formula or in the subsequent formula, respectively. It is also possible, however, that such a threshold value of stability represents the production stability of the lower of the two values of the application formula and of the subsequent formula. If it is to thus be assumed that a reduction of the production stability is to be expected from the application formula to the subsequent formula due to the predetermination, the production stability of the subsequent formula can thus be set by means of the threshold value of stability. As a result, an unwanted decrease below the target production stability of the subsequent formula is avoided during the transition between the two formulas. In other words, the threshold value of stability can be selected either with direct reference to the production stability of the two used formulas or independently thereof.

The last step of a method according to the invention deals with the fact that changing the material in the at least one supply device depends on the result of comparison. It is thus ensured that the material is changed only when the predetermined production stability is larger than or equal to the predetermined threshold value of stability. It is thus prevented that an unwanted decrease of the production stability could lead to a breakage in the production of the plastic film. Other defects or disadvantages within the production process, which are associated with an unwanted reduction of the production stability, can also be avoided effectively in this way.

In addition to the fundamental improvement of safety by means of a method according to the invention, a reduction with regard to the required number of machine operators is also attained at the same time. It is thus now possible for a single machine operator to change the material completely, because the method according to the invention ensures that no reaction whatsoever is required any longer due to an undesirably low production stability by adapting operating parameters. In addition to time savings and the increased safety, this leads to a reduction of personnel costs in the operation of a correspondingly equipped extrusion device.

It may be advantageous when, in the case of a method according to the invention, for the step of predetermining the production stability, the impact on the production stability for the feedstock and a subsequent material are read out from a database. It is thus conceivable for a corresponding database, which has material data of the feedstock and of the subsequent material to be provided, in a control device or in the extrusion device itself. This material data can moreover be correlated with corresponding percentages of proportional factors, so that the database includes a statement, which percentage of an application formula or subsequent formula, respectively, the respective material correlates with which impact on the production stability. It can thus be read out from the database, how the removal of a feedstock or the addition of a corresponding subsequent material, respectively, behaves with regard to an impact on the production stability. This is a particularly simple and cost-efficient solution for providing a method according to the invention. The productions stability can thereby be provided with a corresponding database in the form of a two-dimensional structure. It goes without saying that significantly more complex databases, which in particular consider the correlation of different multi-component supply devices, are conceivable in the context of the present invention at hand. In particular the impact of individual materials on other material within a layer can thus also be considered in such a database.

Moreover, it is an advantage when, in the case of a method according to the invention, for the step of predetermining the production stability, the correlation of the supply device to a corresponding layer of the film, which is to be produced, is considered. This means that the corresponding layer of a supply device or of a plurality of supply devices, respectively, of the corresponding extruder or of the extrusion device, respectively, correlates with a corresponding layer in the plastic film. A layer located in the center of the plastic film can thus allow for different production stability fluctuations than is the case in an edge layer of the plastic film. By considering the effect of changing the material of the corresponding supply device on the corresponding layer of the plastic film, a predetermination of the production stability can be attained even more accurately and more efficiently in the entire production and thus a further increase of the safety when changing the material. Not only the position and the location of the respective layer are considered thereby, but preferably moreover also the corresponding transport layer of the respective supply device or the different layer thicknesses, respectively, which the different layers of the film, which is to be produced, can have.

It is a further advantage, when the production stability for a multi-layer film is simulated in a method according to the invention, in particular when at least two, preferably all different orders of the supply device are simulated when changing the material in terms of the production stability, which is to be expected. A simulation is thereby preferably carried out for the entire multi-layer film, so that preferably two or even all different orders are simulated. In particular a possible path of changing the material is thereby provided and simulated, and an evaluation of this path is carried out subsequently or already in the course of the simulation. It is thus conceivable, for example, that a corresponding path between the individual supply devices, thus one change strategy after the other, is tried out purely by chance, until a production stability, which is too low, is predetermined for one step of changing the material. The path is interrupted at this point and an alternative is chosen. This is one option for randomly providing one possible permitted path for changing the material and thus an optimized change strategy in a particularly cost-efficient and simple manner by means of the simulation. It is also possible for an optimized change strategy, which is thus optimal with regard to all possible orders, to be calculated by means of the simulation or to be provided, respectively, based on a simulation of all possible orders and all possible correlations of the change strategy. It is in particular avoided in this manner that, as a result of inept change strategies, the entire situation of the extrusion devices leads to a dead end, in which the desired production stability can be maintained above the stability threshold value by means of no further change between a feedstock and a subsequent material.

It is further advantageous, when, in the case of a method according to the invention the steps of predetermining and of comparing are carried out for all supply devices, and when an order of the supply devices for changing the material is subsequently provided. This means that the complete change path and thus the complete change strategy for all supply devices are provided in the context of the present invention. This provision for changing the material in particular takes place in a visual manner, so that a corresponding guiding of the machine operator is provided, for example in the form of a display device. It goes without saying that this can also include a parallel or partially parallel processing in the context of changing the material, so that two or more supply devices can be processed parallel in time or so as to overlap in time, respectively, and thus simultaneously in terms of changing the material. This is a particularly simple and cost-efficient solution for even further reducing the total time for changing the material and to nonetheless ensure the high safety by means of a method according to the invention.

It is also advantageous, when, in the case of a method according to the invention, the step of changing the material is carried out as long as at least one stable and/or stabilizing layer of a film results in the predetermination of a production stability above the stability threshold value. In other words, this means that at least one stable or stabilizing layer is always produced. As a result, all other layers of the film can substantially be processed free from any impact on the production stability in terms of a transition for changing the material, because the stable or stabilizing layer, respectively, keeps the production stability for the entire plastic film above the stability threshold value. A stable layer in itself is so stable that the production stability is maintained sufficiently regardless of changes in the adjacent layers. A stabilizing layer alone does even though not have the desired stability, it is associated with a sufficient production stability in cooperation with the further layers, which are available, but which are unstable in themselves.

It is a further advantage when, in the case of a method according to the invention, the actual production stability is monitored and recorded while and/or after changing the material in at least one supply device. The step of recording the production stability is thereby preferably optional. It goes without saying that it is conceivable that an online feedback exists, so to speak, when carrying out this monitoring, so that a corresponding warning can be output in response to a deviation from the predetermination. This makes it possible to furthermore provide a feedback with a database, so that substantially a self-locking database is provided. Ultimately, a monitoring is also possible in this way, in order to be able to output a corresponding warning in the case of errors or in the case of incorrect operation by the machine operating personnel.

It may also be advantageous, when, in the case of a method according to the invention, the steps of predetermining and of comparing are carried out for a manual proposal of an order. A manual proposal is to thereby in particular be understood as the input by the operating personnel. A machine operator, for example, can thus input his corresponding own proposal for a change strategy, which is subsequently verified in terms of the impact and the course of the production stability by the predetermination in the context of the method according of the invention. This input and verification can for example be made at a terminal, which is provided as part of the machine control. Implicit actions, however, are also conceivable as input, so that for example the start of changing the material in a supply device is assessed as being a step of a change strategy, which accordingly triggers the steps of predetermining and comparing. An implicit verification is thereby at hand, so to speak, so that a corresponding warning signal is output to the machine operator in response to a faulty order or in response to a material change, respectively, which would lead to a low production stability.

It is further advantageous, when, in the case of a method according to the invention, at least one production parameter of the corresponding extruders is adapted while changing the material for at least one supply device, depending on the result of comparison, in particular at least one of the following:

temperature of the extruders
film thickness
speed of the production
extruder output
blow-up ratio The above enumeration is not an exhaustive list. By adapting the control or regulation of the extrusion device, an impact on the expected production stability, which is too low, is made possible. This can furthermore have the result that small production stabilities are also permitted, because a lowering of the production stability is automatically avoided in such a manner by means of a corresponding impact that an operation counteracting can take place accordingly. The freedom in changing the material thus becomes even larger, so that in particular other prioritizing features can be used in order to be able to accordingly provide change strategies, which are improved from a different point of view. In addition to the production stability, such changed change strategies refer for example to the duration of the rinsing time of individual materials and/or to the costs for the material for the use of such materials. It is now conceivable that for example a material with a very long rinsing time is first changed in an extrusion device, even though a predetermination provides for a significantly reduced production stability. By impacting production parameters, an improved change strategy can thus be attained from the aspect of the rinsing time, because the reduction of the production stability is reacted to by a corresponding impact on operating parameters. The same also applies for a corresponding reduction of the total costs, when particularly expensive feedstock is moved out of the application formula very early on and is processed first in the context of changing the material.

It is further advantageous, when, in the case of a method according to the invention, a rinsing time is additionally determined for each feedstock, which is to be changed, and when it is considered for the selection of the order of the supply device. In addition to the rinsing time, it is also possible, as explained in the above paragraph, to provide the material price, a temperature strategy or a production stability per se as priority. This provision of the prioritization, thus to which parameter the highest importance is to be attached in the change strategy, can in particular be input manually. A correlation of different priorities is in particular also conceivable, so that for example the production stability can be considered in addition to the material price and the rinsing time. The term of a temperature strategy is to be understood such that it is important to note in particular in response to a reduction of the extruder temperature that the cooling down of the extruder temperature takes a certain amount of time. This time can only be accelerated with great difficulty, because the temperature management at an extrusion device is highly complex. This temperature strategy can thus additionally be applied for the entire method, in order to ensure that the extruder does in fact have the correct temperature, if possible at the ideal point in time at the beginning of the production with the subsequent formula.

It is also advantageous, when, in the case of a method according to the invention, the gradient of the production stability is predetermined for changing all of the material for all supply devices and when it is considered for changing the material. The gradient is to thereby be understood as the speed of the change of the production stability. In particular a change path, which leads to a particularly continuous or particularly flat gradient, respectively, with the help of this change strategy, is thereby chosen. Large jumps, in particular local minima, are to be avoided in any event. According to the invention, a linear change with correspondingly constant gradients is thus preferred when selecting the corresponding change strategy.

It is further advantageous when, in the case of a method according to the invention, the steps of predetermining and of comparing are repeated while changing the material, in particular when they are carried out continuously. This embodiment of a method according to the invention can also be identified as online monitoring, so that the method is carried out again, for example after each or for each supply device, respectively. An adaptation of the change strategy is thus also possible, when the user in the form of the machine operating personnel acts in a manner, which deviates from the change strategy, for example in the context of changing the material, and chooses other supply devices, when changing the material.

Further advantages, features and details of the invention follow from the description below, in which exemplary embodiments of the invention are described by referring to the drawings. The features mentioned in the claims and the description can thereby be significant for the invention, in each case alone or in any combination. Schematically:

DETAILED DESCRIPTION

Figure 1:
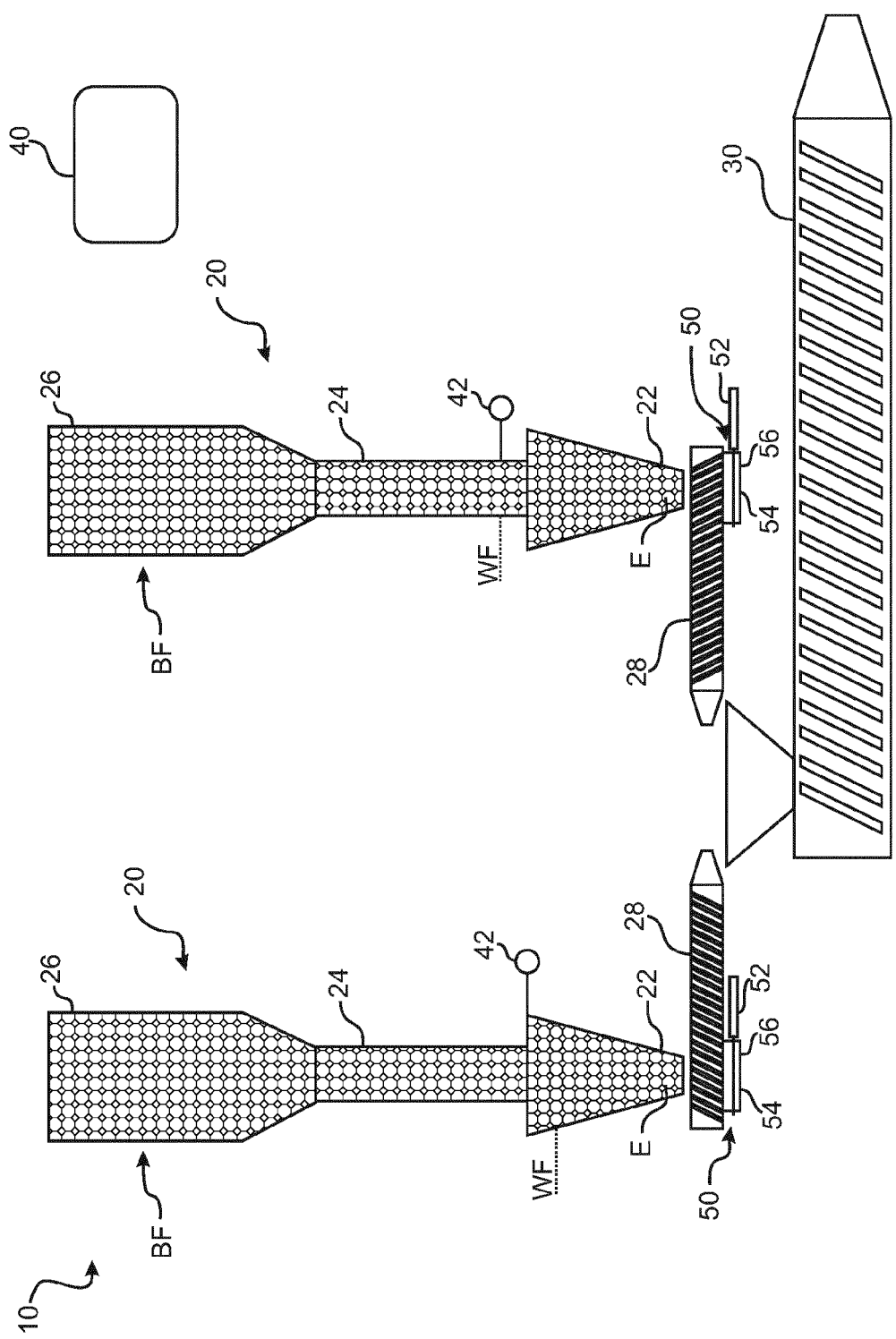
FIG. 1 shows a first embodiment of an extrusion device according to the invention in the operating state.

FIGS. 1 to 6 illustrate an extrusion device 10 schematically, which is equipped with two supply devices 20. Each of these supply devices 20 is equipped with a feed container 26, a down pipe 24 and a weighing funnel 22. FIG. 1 shows the operating situation, wherein each supply device 20 is filled with a feedstock E up to a full operating filling level BF. In this state, the respective feedstock E is supplied to an extruder 30 via dosing screws 28 and is used for the production of the plastic film there. A method according to the invention is thereby carried out in a corresponding control device 40.

Figure 2:
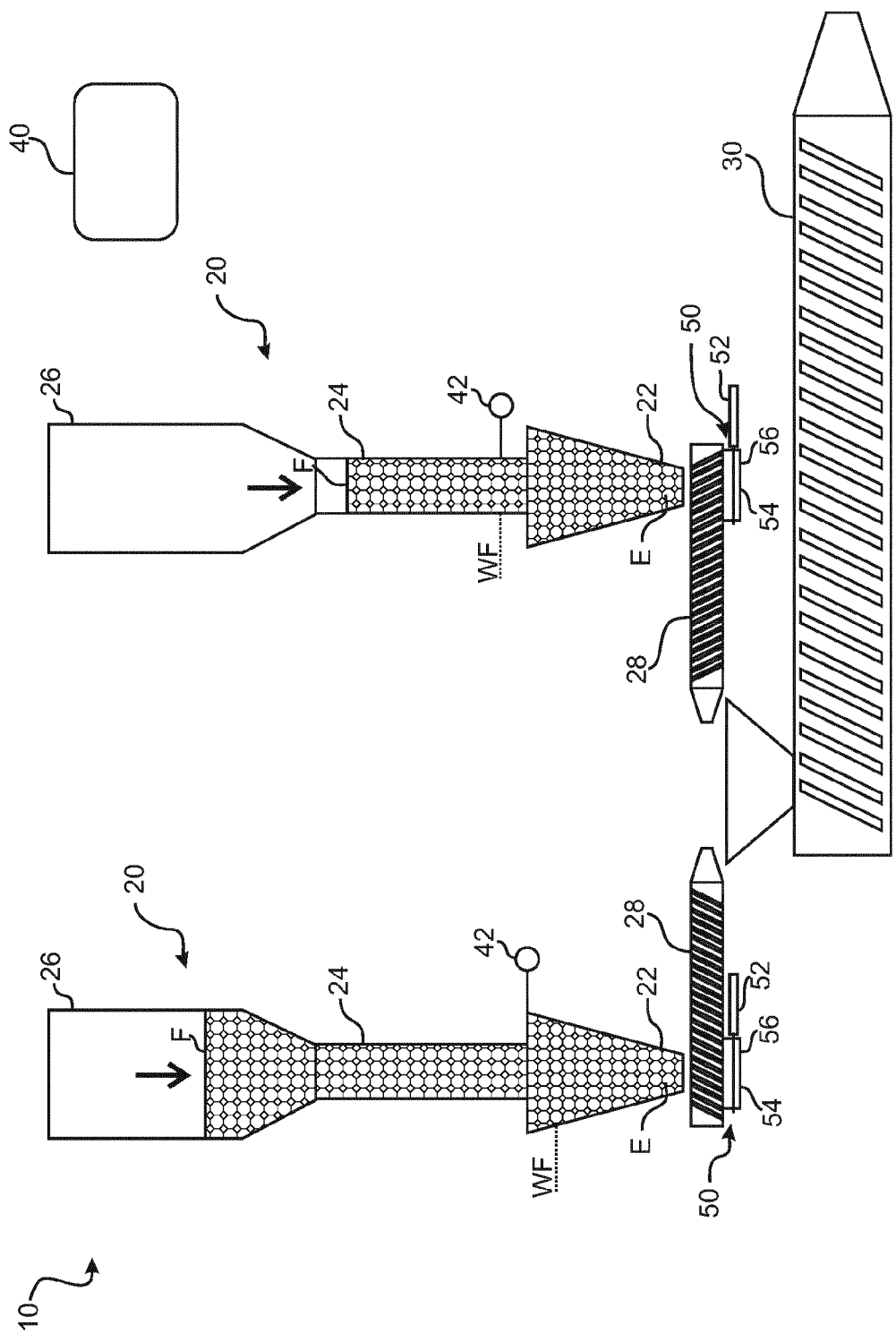
FIG. 2 shows the embodiment of FIG. 1 during a lowering of the filling levels.
Figure 3:
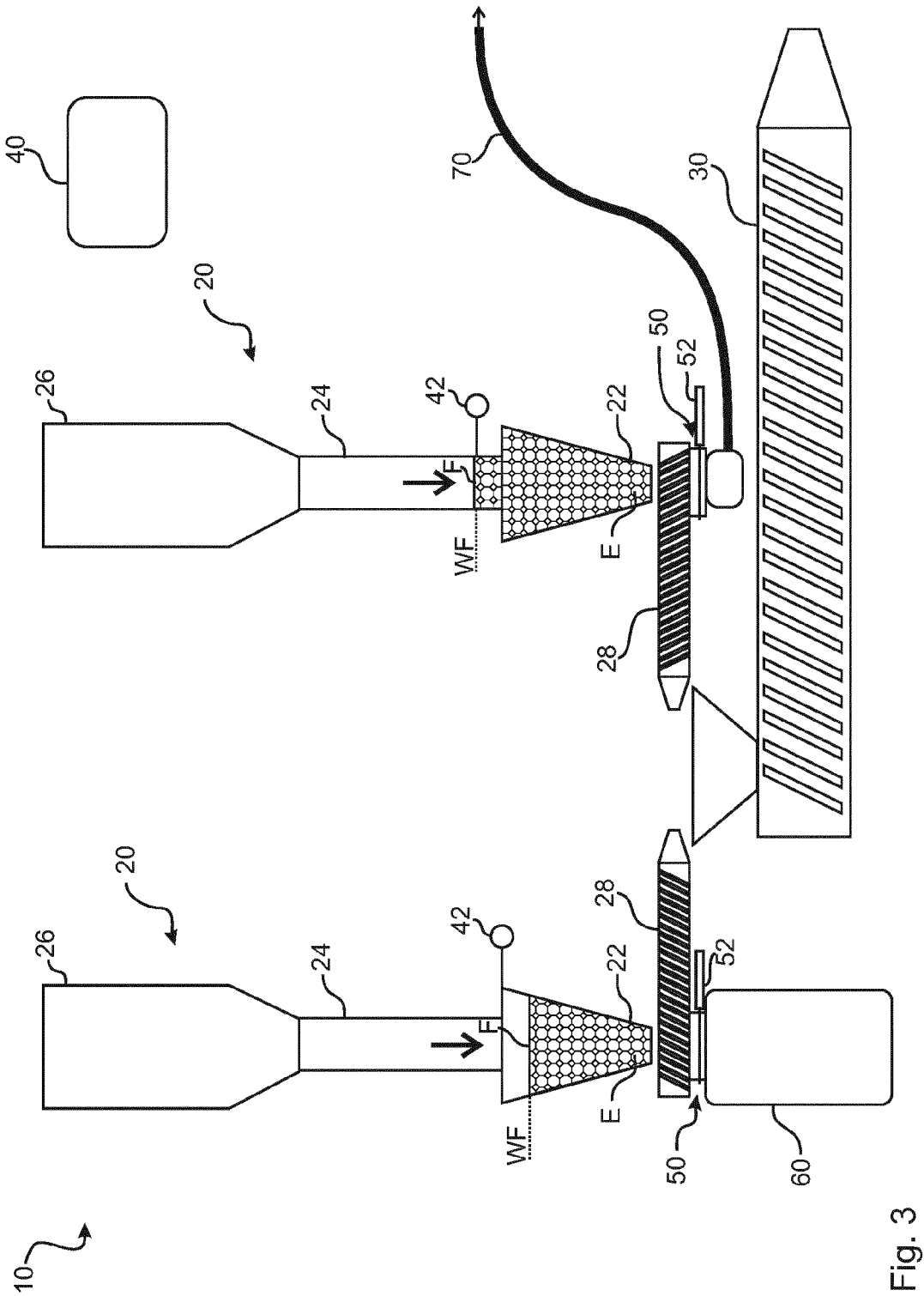
FIG. 3 shows the embodiment of FIGS. 1 and 2 with a filling level at changing filling level.
Figure 4:
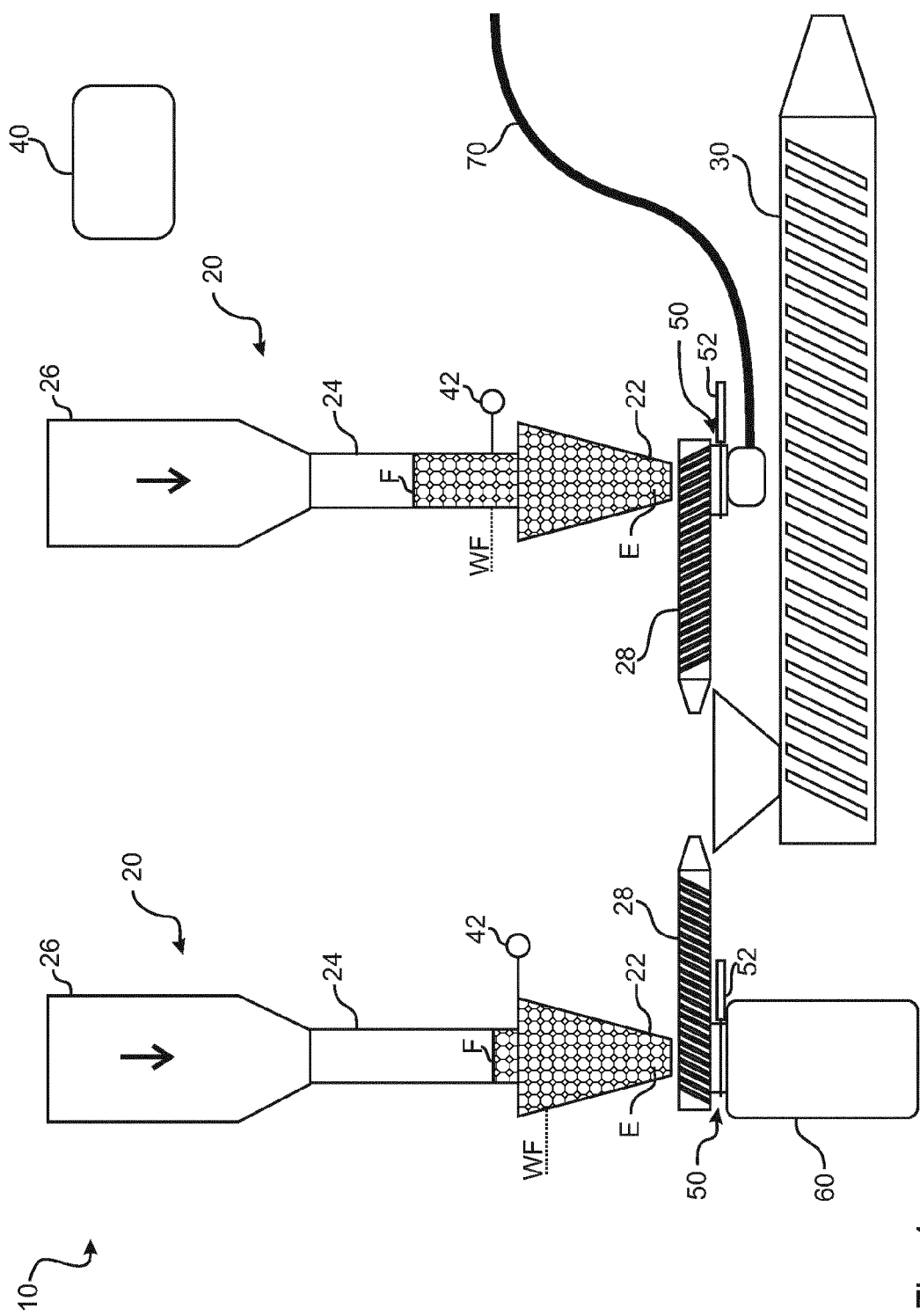
FIG. 4 shows the embodiments of FIGS. 1 to 3 with a fluctuating filling level, which is kept at changing filling level.

As preparation for changing the material, FIG. 2 shows how a lowering of the filling levels F of the feedstock E takes place. By further production without refilling into the supply devices 20, the filling level F now drops, until it reaches a changing filling level WF according to FIG. 3. So as not to fall below this changing filling level WF, provision is made for corresponding filling level sensors 42, so that a short refilling in the form of a refilling push takes place at the point in time according to FIG. 3, so that substantially a fluctuating holding of the filling level F at the level according to FIGS. 3 and 4 takes place.

Figure 5:
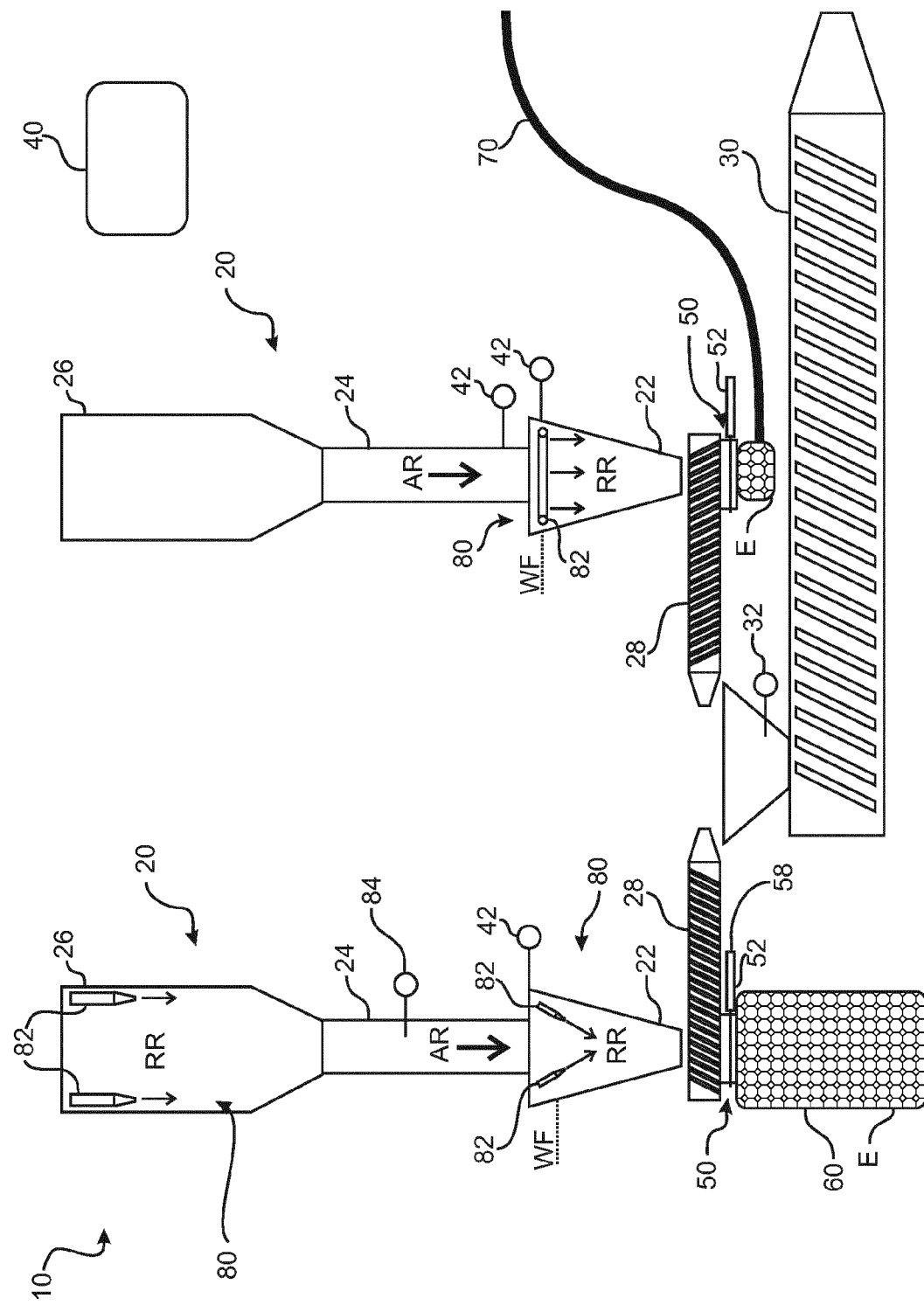
FIG. 5 shows the embodiment of FIGS. 1 to 4 during a cleaning situation.

FIG. 5 shows, how the feedstock E can be completely discharged downwards from the supply devices 20 at the time of actually changing the material. The catching can occur in a discharge container 60 as well as with the help of a returning device 70. For the discharging, here discharge openings 50 are provided, which are closed by means of a discharge closure 52. The corresponding arrangement of the discharge containers 60 is possible via a container interface 54. Last but not least, provision is made for an opening sensor 58, which can in particular be used in response to a cleaning step, which is to be carried out, with a cleaning device 80 comprising a plurality of cleaning means 82.

Figure 6:
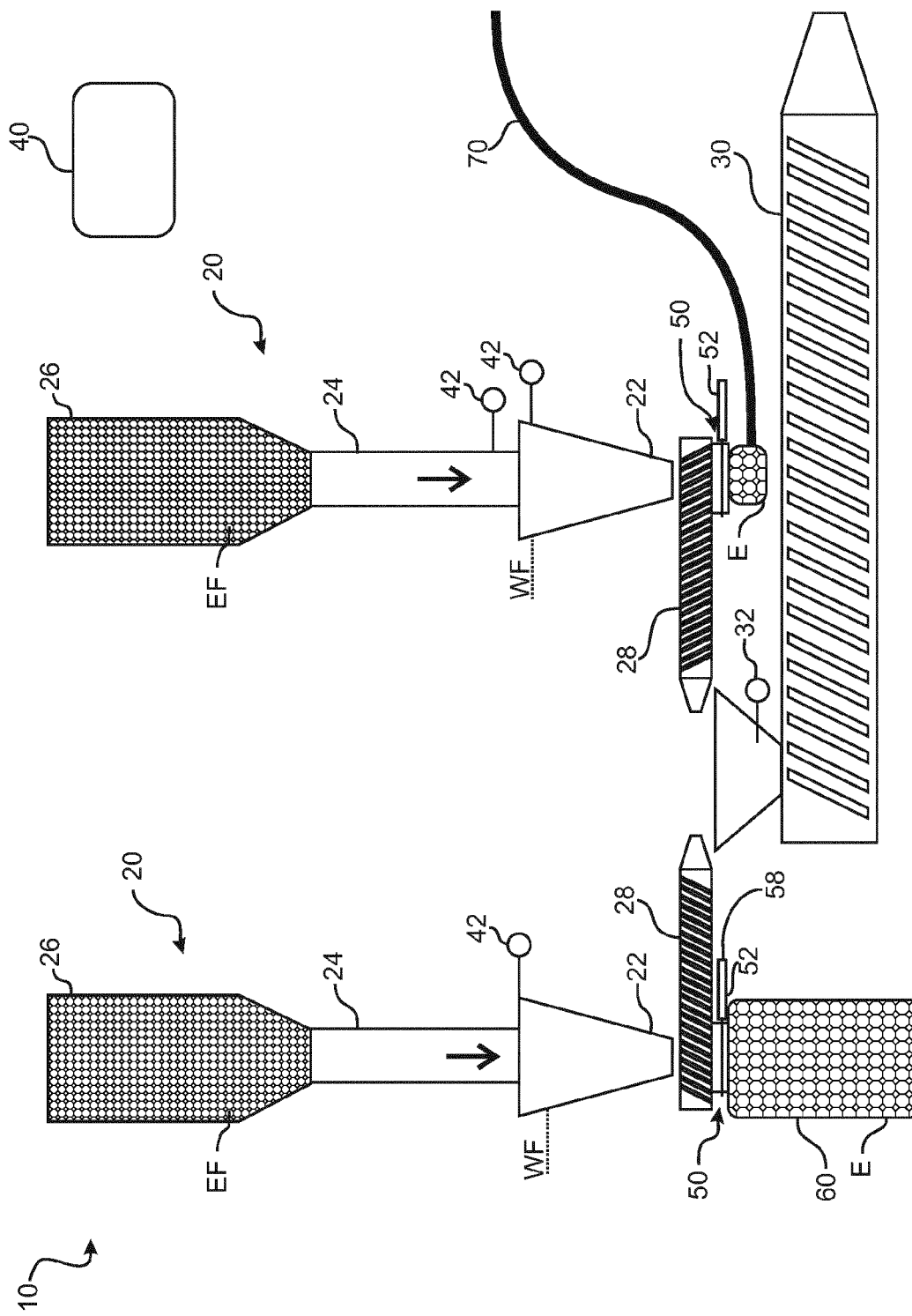
FIG. 6 shows the embodiment of FIGS. 1 to 5 during the refilling with a subsequent material.

It is illustrated in FIG. 6, how a subsequent material EF can already be filled back into the feed containers 26 of the supply devices 20 at this point in time, so that the switchover between the feedstock F and the subsequent material EF can subsequently take place particularly quickly and with small mixing.

Figure 7:
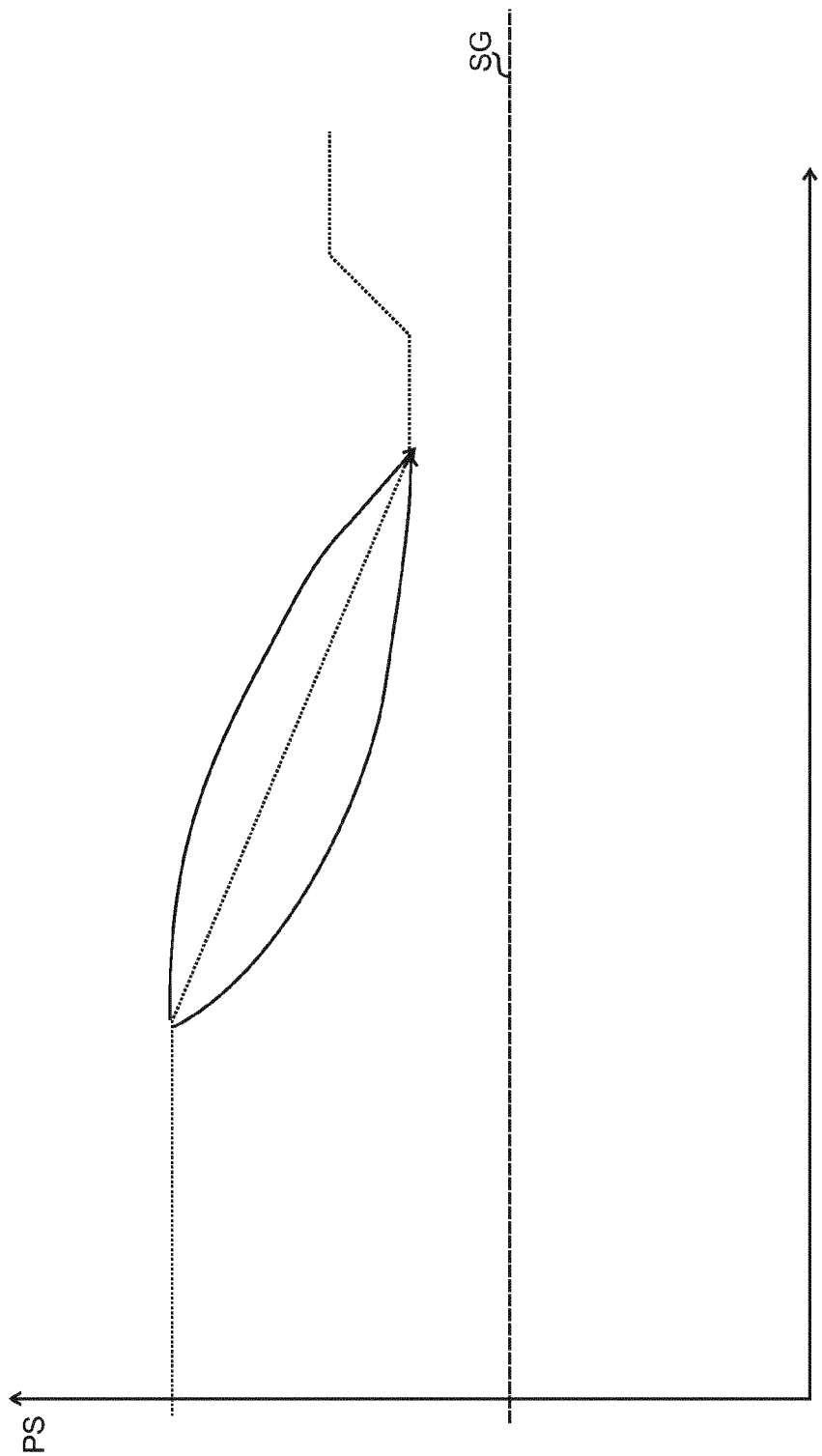
FIG. 7 shows an option of a course of the production stability.
Figure 8:
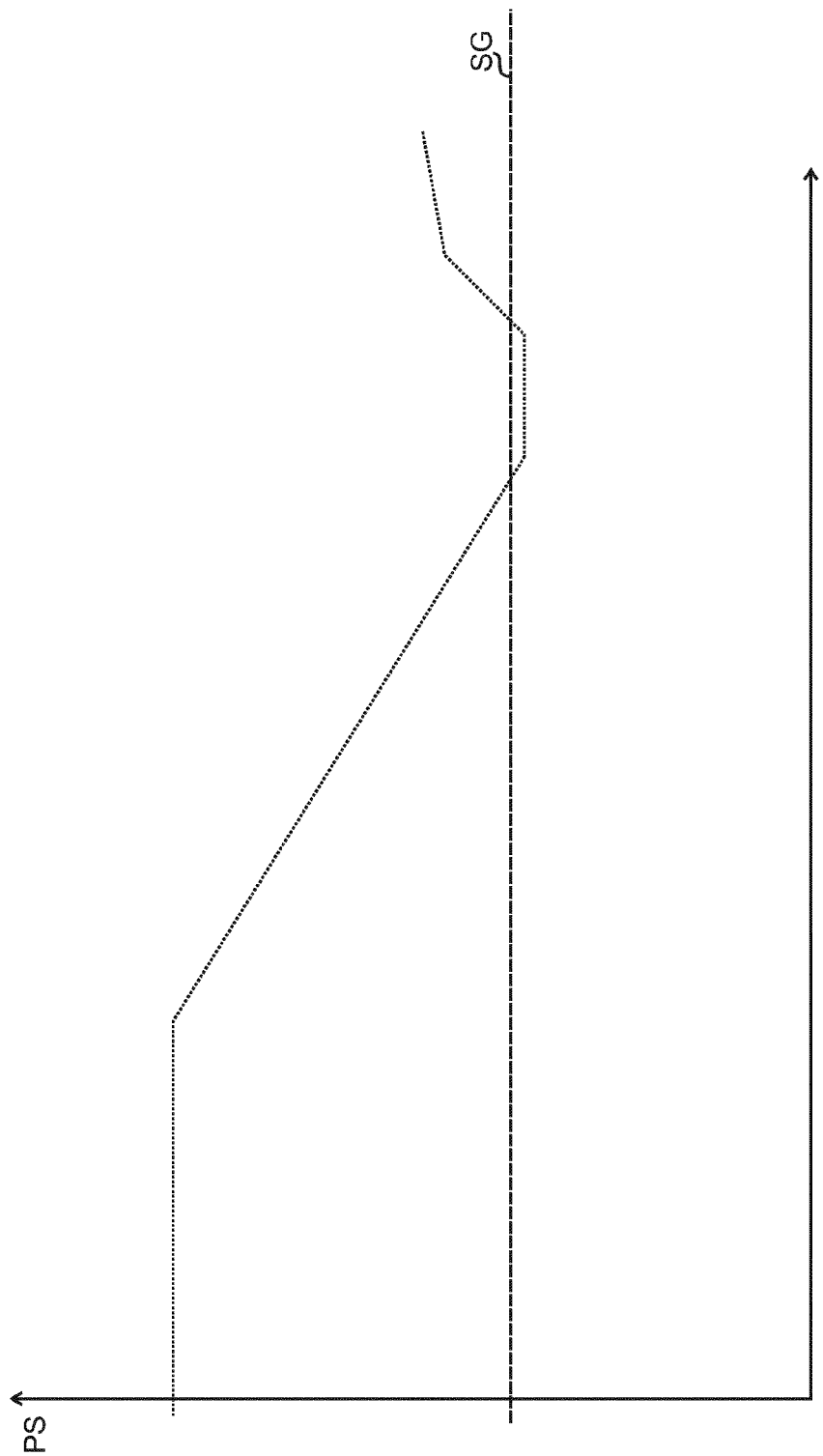
FIG. 8 shows a further option of a course of a production stability.
Figure 9:
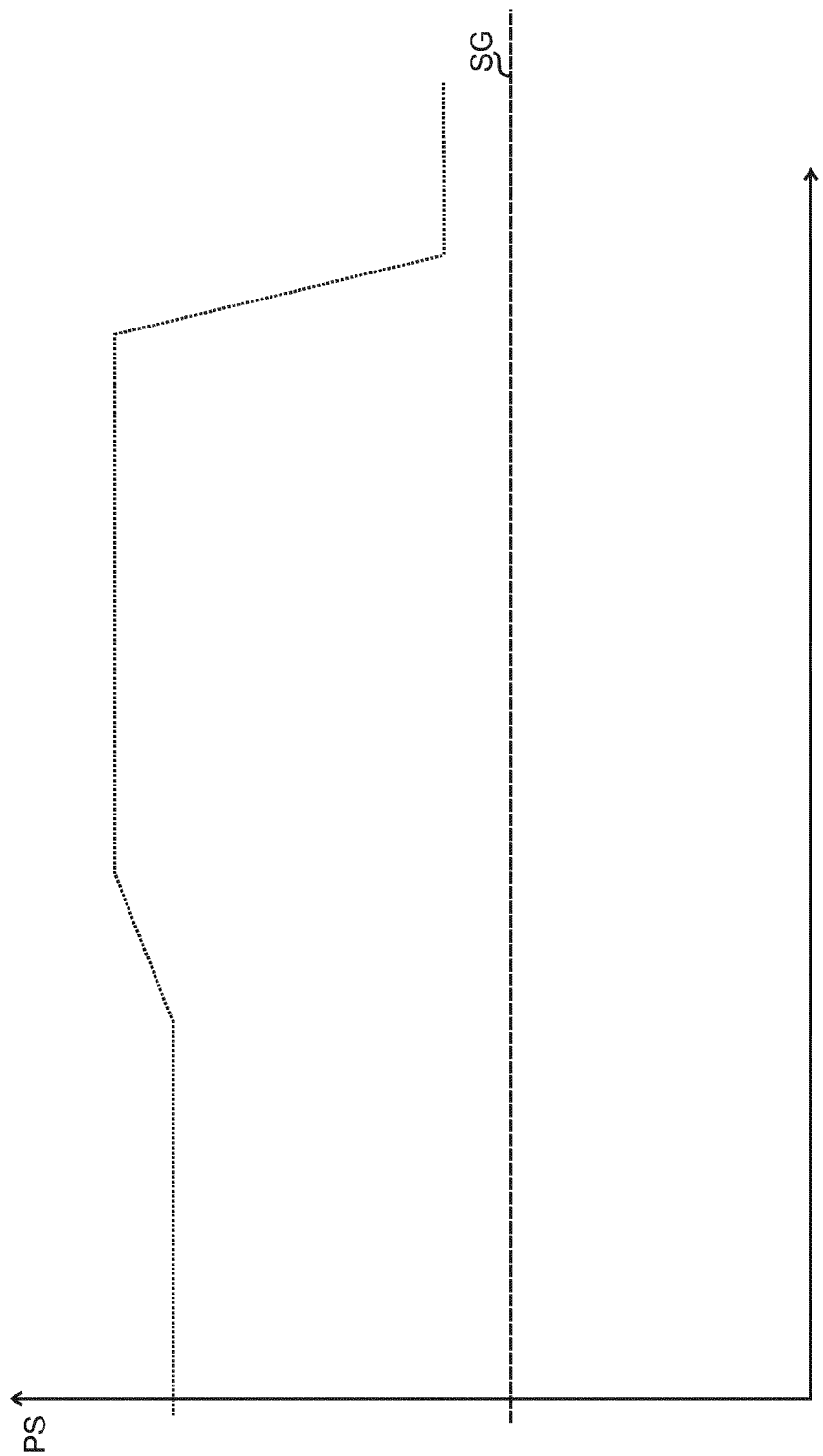
FIG. 9 shows a further option of a course of a production stability and FIG. 10 shows an alternative embodiment of an extrusion device.

FIGS. 7 to 9 show options of a course of the production stability PS over time. FIG. 7 shows, how a transition is to be made to an average production stability PS on the very right by means of the dashed line. On the left, the situation in the case of application formula is shown, and the situation in the case of subsequent formula is shown on the right. In the case of this course, it can be seen that the production stability PS is always above the threshold for stability SG. It is illustrated by means of the two curved illustrations that unwanted gradient courses exist here, even though the threshold for stability SG is always exceeded. The dashed line, by means of which a linear transition between the individual production stabilities PS is provided with substantially consistent and constant gradients, is preferred.

FIG. 8 shows a situation, which is unwanted and which is avoided by predetermining the production stability PS. In the course at the transition between the two formulas, a decrease of the production stability PS below the threshold for stability SG is thus at hand here, so that this path is avoided for a change strategy.

FIG. 9 shows a substantially optimized change strategy, so that the production stability PS lies at a higher level for the majority of time of the change between the two formulas, than in the case of the application formula. The production stability PS decreases strongly only shortly prior to the end of changing the material and then remains on the level of the subsequent formula. The threshold for stability SG is also never fallen below here.

Figure 10:
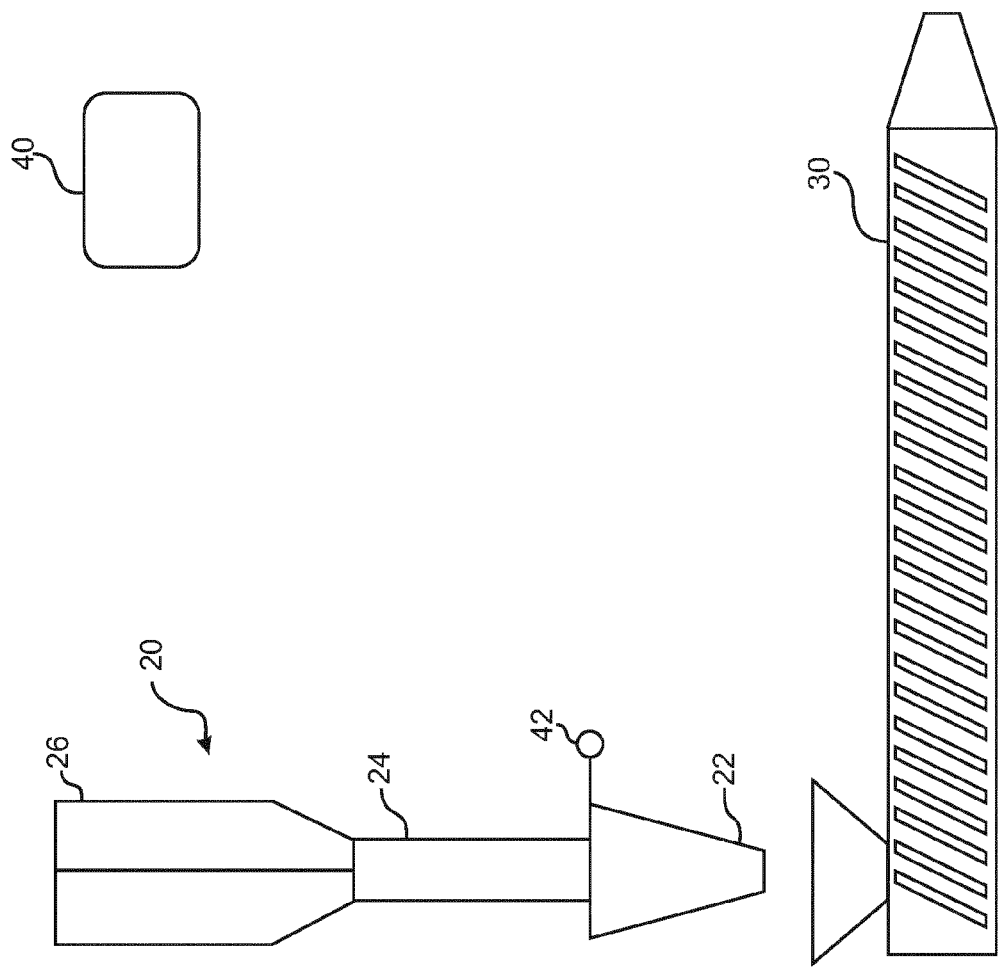

FIG. 10 shows an alternative embodiment of an extrusion device 10. With regard to the advantages described according to the invention, said extrusion device is based on the embodiment of FIG. 1, but differs in the refilling function. A so-called batch process is thus provided here for the refilling. The feed container 26 is equipped with separate volumes, so that each volume of the feed container 26 can be understood to be a supply device 20. Components in the form of the down pipe 24 and of the weighing funnel 22 arranged therebelow are thus common components of the different supply devices 20. Below the weighing funnel 22, a mixing funnel, in particular comprising a mixer drive, is provided which allows for a homogenization prior to entering the extruder.

LIST OF REFERENCE NUMERALS 10 extrusion device
20 supply device
22 weighing funnel
23 funnel opening
24 down pipe
26 feed container
28 dosing screw
30 extruder
32 emergency sensor
40 control device
42 filling level sensor
50 discharge opening
52 discharge closure
54 container interface
56 sensor device
58 opening sensor
60 discharge container
62 discharge volume
70 return device
80 cleaning device
82 cleaning means
84 dust sensor
E feedstock
EF subsequent material
BF operating filling level
WF changing filling level
F filling level
PS production stability
SG threshold value of stability

I claim:

1. A method for changing feedstock material in an extrusion device for producing plastic films comprising at least two supply devices for supplying feedstock for an extruder, comprising the following steps:
   identifying a change request for changing feedstock material in the extrusion device,
   calculating a predicted stability of a plastic film for a time after the feedstock material of at least one supply device has been changed,
   comparing the predicted stability to a threshold value of stability, and
   changing the feedstock material in the at least one supply device depending on the result of the comparison of the predicted stability to the threshold value of stability and as long as the predicted stability is above the threshold value of stability for at least one layer of the plastic film, wherein the step of calculating the predicted stability of the plastic film for the time after the feedstock material has been changed further comprises verifying how the subsequent change of the feedstock material of the at least one supply device will impact the predicted stability and further considering the correlation of the at least one supply device with the at least one layer of the plastic film that is to be produced.

2. The method according to claim 1, wherein the step of calculating the predicted stability of the plastic film further comprises retrieving material data concerning a presently-used feedstock material and a new feedstock material from a database and calculating the predicted stability of the plastic film based on the material data.

3. The method according to claim 1, wherein the plastic film is a multi-layer film, and wherein the step of calculating the predicted stability of the plastic film further comprises calculating a predicted stability of a first layer of the multi-layer film when the feedstock material for the first layer is supplied by a first supply device of the at least two supply devices and calculating a predicted stability of a second layer of the multi-layer film when the feedstock material for the second layer is supplied by a second supply device of the at least two supply devices.

4. The method according to claim 1, wherein the plastic film is a multi-layer film, and wherein the predicted stability for each layer of the multi-layer film is calculated and simulated for each of the at least two supply devices.

5. The method according to claim 1, wherein the steps of calculating the predicted stability of the plastic film and comparing the predicted stability to the threshold value of stability are carried out for each of the at least two supply devices, and an order of the at least two supply devices for changing the feedstock material is subsequently provided.

6. The method according to claim 1, wherein a measured stability of the plastic film is monitored and recorded at least while or after changing the feedstock material in at least one supply device.

7. The method according to claim 1, wherein the steps of calculating the predicted stability of the plastic film and comparing the predicted stability to the threshold value of stability are carried out based on user defined input parameters during an extrusion process.

8. The method according to claim 1,
   wherein at least one production parameter is adapted while changing the feedstock material for at least one supply device depending on the result of the comparison of the predicted stability to the threshold value of stability.

9. The method according to claim 1, wherein a rinsing time is determined for each feedstock material which is to be changed, and wherein the rinsing time is considered for a selection of an order of the supply devices.

10. The method according to claim 1, wherein the step of calculating the predicted stability of the plastic film further comprises calculating the predicted stability of the plastic film based on a speed with which the feedstock material is provided to the at least two supply devices, and wherein the step of changing the feedstock material in at least one supply device further comprises changing the speed with which the feedstock material is provided based on the comparison of the predicted stability to the threshold value of stability.

11. The method according to claim 1, wherein the steps of calculating the predicted stability of the plastic film and comparing the predicted stability to the threshold value of stability are repeated while changing the feedstock material.

12. The method according to claim 4, wherein at least two different orders of the at least two supply devices are simulated when changing the feedstock material in terms of the predicted stability of the plastic film.

13. The method according to claim 4, wherein all different orders of the at least two supply devices are simulated when changing the feedstock material in terms of the predicted stability of the plastic film.

14. The method according to claim 8, wherein at least one of the following production parameters is adapted while changing the feedstock material for at least one supply device of the at least two supply devices depending on the result of comparison of the predicted stability to the threshold value of stability:
- temperature of the extruder,
- film thickness,
- speed of the production,
- extruder output, and
- blow-up ratio.

15. The method according to claim 1, wherein the steps of calculating the predicted stability of the plastic film and comparing the predicted stability to the threshold value of stability are carried out continuously while changing the feedstock material.

* * * * *